United States Patent
Ogino et al.

(10) Patent No.: US 9,073,004 B2
(45) Date of Patent: Jul. 7, 2015

(54) CARBON DIOXIDE SEPARATION APPARATUS

(71) Applicant: KAWASAKI JUKOGYO KABUSHIKI KAISHA, Kobe-shi, Hyogo (JP)

(72) Inventors: Tomoyuki Ogino, Kobe (JP); Yoshiharu Nonaka, Kobe (JP); Masatoshi Hirokawa, Kobe (JP); Takeshi Okumura, Kakogawa (JP); Takatoshi Shoji, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/360,430

(22) PCT Filed: Oct. 11, 2012

(86) PCT No.: PCT/JP2012/006516
§ 371 (c)(1),
(2) Date: May 23, 2014

(87) PCT Pub. No.: WO2013/084394
PCT Pub. Date: Jun. 13, 2013

(65) Prior Publication Data
US 2014/0331864 A1 Nov. 13, 2014

(30) Foreign Application Priority Data

Dec. 9, 2011 (JP) ................................. 2011-270316

(51) Int. Cl.
*B01D 53/08* (2006.01)
(52) U.S. Cl.
CPC ................. *B01D 53/08* (2013.01); *Y02C 10/06* (2013.01); *Y02C 10/08* (2013.01);
(Continued)

(58) Field of Classification Search
CPC .............. B01D 2252/204; B01D 2253/25; B01D 2257/504; B01D 2257/80; B01D 2258/0283; B01D 2259/4009; B01D 53/08; Y02C 10/06; Y02C 10/08
See application file for complete search history.

(56) References Cited

U.S. PATENT DOCUMENTS

2008/0138265 A1* 6/2008 Lackner et al. ............... 423/224
2011/0296872 A1* 12/2011 Eisenberger .................... 62/640
(Continued)

FOREIGN PATENT DOCUMENTS

| JP | 53-12778 A | 2/1978 |
|----|-----------|--------|
| JP | B2-3-7413 | 2/1992 |

(Continued)

OTHER PUBLICATIONS

International Search Report issued in International Patent Application No. PCT/JP2012/006516 dated Jan. 15, 2013.
(Continued)

*Primary Examiner* — Christopher P Jones
(74) *Attorney, Agent, or Firm* — Oliff PLC

(57) ABSTRACT

There is provided a moving bed type CO2 separation apparatus that is capable of achieving steady recovery of CO2, and that is energy-efficient. An adsorbent hopper that supplies a CO2 adsorbent of a moving bed to an adsorption tower that adsorbs CO2 from a treatment-target gas is provided. Below the adsorption tower, a moving bed-type regeneration tower for regenerating the CO2 adsorbent having adsorbed CO and a moving bed-type drying tower that dries the regenerated CO2 adsorbent are provided. Desorption-purpose steam generated from the drying tower is supplied to the regeneration tower. By allowing the desorption-purpose steam to be condensed on the CO2 adsorbent, CO2 is desorbed from the CO2 adsorbent. Thus, CO2 adsorbent forming a moving bed is used in a circulating manner through the CO2 separation apparatus, and the energy used for drying the condensed water contained in the CO2 adsorbent is used for desorbing CO2.

8 Claims, 3 Drawing Sheets

(52) U.S. Cl.
CPC ...... *B01D 2252/204* (2013.01); *B01D 2253/25* (2013.01); *B01D 2257/504* (2013.01); *B01D 2257/80* (2013.01); *B01D 2258/0283* (2013.01); *B01D 2259/4009* (2013.01)

(56) References Cited

U.S. PATENT DOCUMENTS

| 2012/0125194 A1* | 5/2012 | Caram et al. ............ 95/41 |
| 2012/0204718 A1* | 8/2012 | Dinnage .................. 95/91 |
| 2014/0096684 A1* | 4/2014 | Ogino ..................... 96/242 |

FOREIGN PATENT DOCUMENTS

| JP | A-6-134302 | 5/1994 |
| WO | 2010/107942 A1 | 9/2010 |
| WO | WO 2011/013332 A1 | 2/2011 |

OTHER PUBLICATIONS

Apr. 13, 2015 Office Action issued in Chinese Application No. 201280058497.1.

* cited by examiner

CARBON DIOXIDE SEPARATION APPARATUS

TECHNICAL FIELD

The present invention relates to a carbon dioxide separation apparatus. More specifically, the present invention relates to a carbon dioxide separation apparatus that successively carries out recovery of high-concentration carbon dioxide from a treatment-target gas containing carbon dioxide using a solid adsorbent loaded with amine or the like, and regeneration of the adsorbent.

BACKGROUND ART

Conventionally, many studies have been made as to carbon dioxide separation apparatuses that separate carbon dioxide from a treatment-target gas containing carbon dioxide. Of these carbon dioxide separation apparatuses, there is a carbon dioxide separation apparatus that allows a treatment-target gas containing carbon dioxide to be brought into contact with a solid adsorbent loaded with amine or the like, such that carbon dioxide is selectively adsorbed (Patent Document 1). As to the adsorbent having adsorbed carbon dioxide, the adsorbed carbon dioxide is desorbed therefrom by a procedure in which the flow of the treatment-target gas is stopped, and thereafter the adsorbent is heated or decompressed. Thus, the adsorbent recovers its adsorption capacity and is regenerated. The regenerated adsorbent can be repetitively used for separating carbon dioxide by being brought into contact again with a treatment-target gas containing carbon dioxide.

In regenerating an adsorbent, the adsorbent is packed in a tower or the like. After the air remaining in the tower and gas other than carbon dioxide are exhausted (decompressed), the adsorbent is indirectly heated (the indirect heating scheme). Alternatively, steam is directly introduced into the packed bed of the adsorbent (the steam supply scheme, Patent Document 3). In the case where such adsorption of carbon dioxide and regeneration of the adsorbent are successively carried out, what is employed is the "fixed bed scheme" in which a plurality of adsorption towers are provided for alternately carrying out adsorption and desorption (Patent Document 2).

PRIOR ART DOCUMENTS

Patent Documents

Patent Document 1: JP 3-7413 B (claim 1)
Patent Document 2: WO 2011/013332 A
Patent Document 3: JP 6-134302 A

SUMMARY OF THE INVENTION

Problems to be Solved by the Invention

However, with the fixed bed scheme, it is necessary to alternately carry out adsorption and desorption of carbon dioxide at a plurality of adsorption towers. Accordingly, the switching operation becomes complicated to automate.

Further, in the case of the indirect heating scheme, high vacuum is required for recovering carbon dioxide of high concentration, which necessitates excessively great pump power. Accordingly, in addition to desorption heat (indirect heat energy) for regenerating an adsorbent, pump power for decompression is required. Further, regeneration of an adsorbent must be carried out under the highest possible vacuum and at low temperatures, in order to also prevent deterioration of amine or the like incurred by excessive heating (Patent Document 1).

Further, with the steam supply scheme, since steam is condensed on the surface of an adsorbent to desorb carbon dioxide, the adsorbent must be dried after regeneration. Accordingly, in the case of the steam supply scheme, in addition to the desorption heat energy (a steam generator) for releasing carbon dioxide, drying heat for drying an adsorbent is required. In addition, pure water for generating steam is consumed.

The present invention has been made to solve the problems of the conventional techniques. An object of the present invention is to provide a carbon dioxide separation apparatus of the moving bed type, which is capable of achieving steady carbon dioxide recovery by shifting the adsorbent itself. Further, other object of the present invention is to provide an energy-efficient carbon dioxide separation apparatus, which is achieved by: obtaining steam by heating water condensed on the adsorbent to desorb carbon dioxide, and using the steam again for desorption of carbon dioxide.

Solutions to the Problems

The carbon dioxide separation apparatus of the present invention is a carbon dioxide separation apparatus that separates carbon dioxide from a treatment-target gas containing carbon dioxide using a carbon dioxide adsorbent and that regenerates the carbon dioxide adsorbent having adsorbed the carbon dioxide, the carbon dioxide separation apparatus including: a moving bed-type adsorption tower in which carbon dioxide is adsorbed from the treatment-target gas by the carbon dioxide adsorbent, the adsorption tower discharging the treatment-target gas having undergone adsorption, the adsorption tower discharging the carbon dioxide adsorbent having adsorbed the carbon dioxide; a moving bed-type regeneration tower that receives the carbon dioxide adsorbent having adsorbed the carbon dioxide and discharged from the adsorption tower, the regeneration tower allowing desorption-purpose steam to be condensed on the carbon dioxide adsorbent such that the carbon dioxide is desorbed from the carbon dioxide adsorbent, the regeneration tower thereafter discharging the carbon dioxide adsorbent; a moving bed-type drying tower that receives the carbon dioxide adsorbent discharged from the regeneration tower, the drying tower heating the carbon dioxide adsorbent such that condensed water contained in the carbon dioxide adsorbent is vaporized as steam and such that the carbon dioxide adsorbent is dried, the drying tower thereafter discharging the dried carbon dioxide adsorbent; and a conveying mechanism that conveys the dried carbon dioxide adsorbent discharged from the drying tower to the adsorption tower, wherein the steam generated by the heating in the drying tower from the condensed water contained in the carbon dioxide adsorbent is used as the desorption-purpose steam in the regeneration tower such that water is used in a circulating manner through the regeneration tower and the drying tower.

Since the carbon dioxide adsorbent of a moving bed is employed, adsorption of carbon dioxide can be successively carried out in the adsorption tower, and desorption of carbon dioxide can be successively carried out in the regeneration tower. Further, since desorption-purpose steam can be obtained from the condensed water contained in the carbon dioxide adsorbent in the drying tower, the energy used for drying carbon dioxide adsorbent can be used for separating carbon dioxide as sensible heat of the desorption-purpose steam.

In the carbon dioxide separation apparatus, the drying of the condensed water contained in the carbon dioxide adsorbent in the drying tower may be carried out by indirect heating, and the steam generated from the condensed water may be entirely used as the desorption-purpose steam.

Further, it is also possible that the drying of the condensed water contained in the carbon dioxide adsorbent in the drying tower is carried out using superheated steam, and mixed steam made up of the steam generated from the condensed water and steam derived from the superheated steam is partially used as the desorption-purpose steam.

In this structure, preferably, the carbon dioxide separation apparatus further includes: an indirect heating device that again supplies superheated steam obtained by heating the mixed steam as the superheated steam in the drying tower; and a circulating pump that allows the mixed steam and the superheated steam to circulate.

The carbon dioxide separation apparatus of the present invention may further include a recovery mechanism that recovers the carbon dioxide having been desorbed and discharged from the regeneration tower.

Further, in the present invention, the regeneration tower and the drying tower may be integrally structured. Thus, a reduction in both costs and size of the carbon dioxide separation apparatus can be achieved.

Still further, the carbon dioxide separation apparatus may further include a gas stream leakage preventing mechanism that is provided immediately upstream from the regeneration tower and/or immediately downstream from the drying tower. Thus, even in the case where a pressure difference is present immediately upstream from the regeneration tower and/or immediately downstream from the drying tower, a reduction in concentration of the recovered carbon dioxide can be prevented.

Still further, the carbon dioxide separation apparatus of the present invention may further include a cooling tower for cooling the carbon dioxide adsorbent discharged from the drying tower.

Effects of the Invention

With the carbon dioxide separation apparatus of the present invention, since the carbon dioxide adsorbent of a moving bed is employed, adsorption of carbon dioxide can be successively carried out in the adsorption tower, and desorption of the carbon dioxide can be successively carried out in the regeneration tower. Therefore, steady recovery of carbon dioxide is achieved. Further, it is not necessary to switch the flow channel of the treatment-target gas. Thus, automation can be easily achieved. Further, since desorption-purpose steam can be obtained from the condensed water contained in the carbon dioxide adsorbent in the drying tower, the energy used for drying the adsorbent is contained in the desorption-purpose steam as it is as sensible heat, to be further used as the energy for generating steam for desorbing carbon dioxide. Thus, an energy-efficient carbon dioxide separation apparatus can be obtained. Further, since desorption-purpose steam is used in a circulating manner, replenishment of pure water for generating the desorption-purpose steam is not required.

EMBODIMENT OF THE INVENTION

With reference to the drawings, embodiments of the present invention will be described in the following. Note that the present invention is not limited to the following description.

A carbon dioxide adsorbent used in the present invention can be prepared by allowing a porous material to load an amine compound. Exemplary porous materials that can be used in preparing a carbon dioxide adsorbent include activated carbon, activated alumina and the like. In the present embodiment, activated carbon is used as the porous material. Exemplary amine compounds include polyethylenimine, monoethanolamine, diethanolamine, triethanolamine, tetraethylenepentamine, methyldiethanolamine, isopropanolamine, diisopropanolamine, dibutylamine, diethylenetriamine, triethylenetetramine, hexamethylenediamine, benzylamine, morpholine and the like. In the present embodiment, diethanolamine is used. In order for an amine compound to be loaded on activated carbon, activated carbon should be put in an aqueous diethanolamine solution adjusted to a predetermined concentration and dried after filtering.

Figure 1:
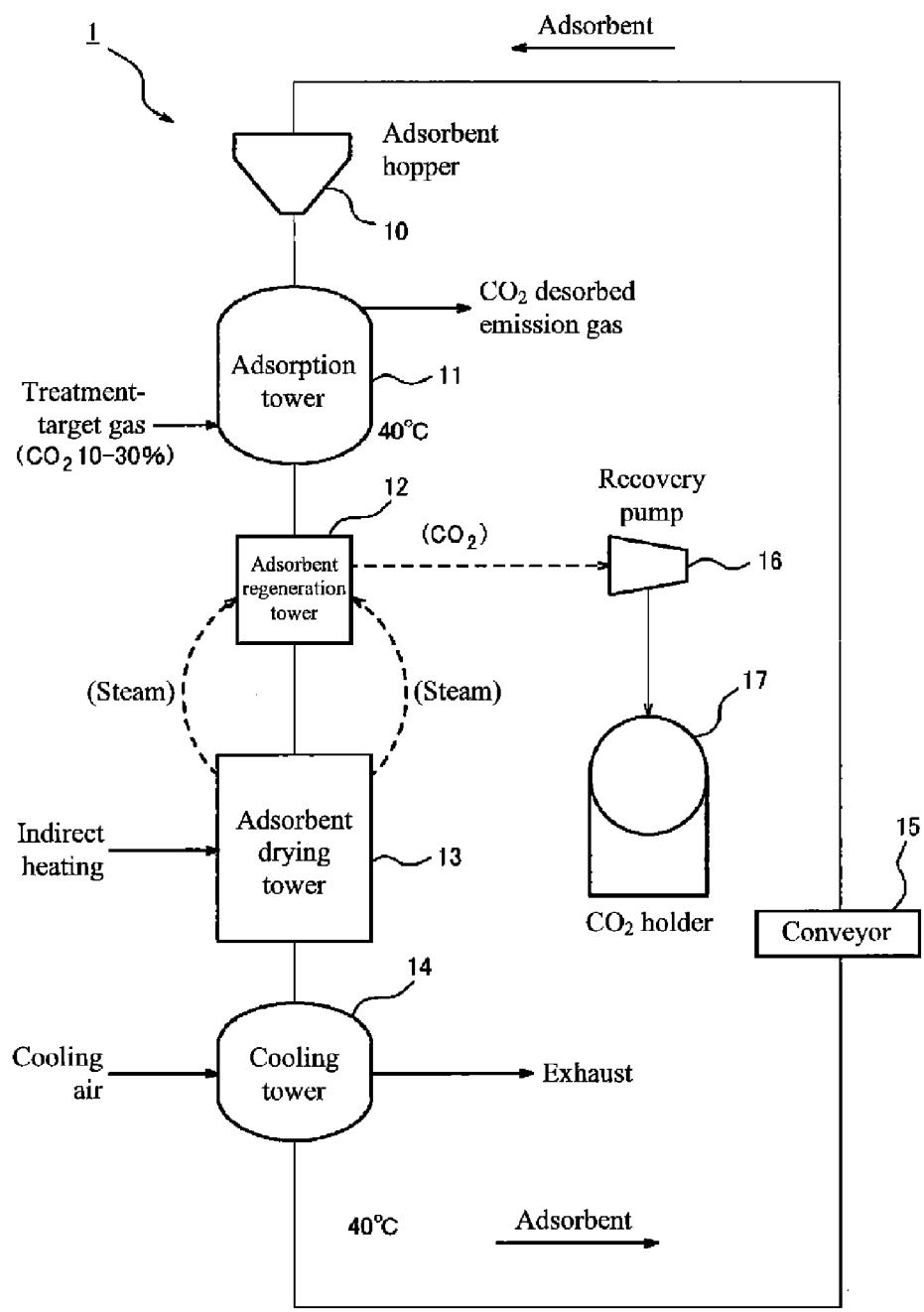
FIG. 1 is a schematic diagram showing the structure of a carbon dioxide separation apparatus of the present invention.

FIG. 1 shows the schematic structure of a carbon dioxide separation apparatus 1 according to an embodiment of the present invention. The carbon dioxide separation apparatus according to the present embodiment includes an adsorption tower 11 that stores a carbon dioxide adsorbent of a moving bed. An adsorbent hopper 10 that supplies the carbon dioxide adsorbent is provided above the adsorption tower 11. From the adsorbent hopper 10, the carbon dioxide adsorbent is supplied at a prescribed speed. Further, the adsorption tower 11 is supplied with a treatment-target gas, which contains carbon dioxide by 10 to 30%, at around the normal pressure. Then, adsorption of the carbon dioxide by means of the carbon dioxide adsorbent is carried out. In the case where the treatment-target gas is combustion exhaust gas, before being introduced into the adsorption tower 11, the treatment-target gas is preferably pretreated by means of desulfurization, a dust removal apparatus, a temperature-reducing tower, a dehumidifier and the like.

Below the adsorption tower 11, a moving bed-type regeneration tower 12 for regenerating the carbon dioxide adsorbent having adsorbed the carbon dioxide and discharged from the adsorption tower 11, and a moving bed-type drying tower 13 for drying the regenerated carbon dioxide adsorbent are provided. The regeneration tower 12 is supplied with desorption-purpose steam generated in the drying tower 13, which will be described later. By allowing the steam to be condensed on the carbon dioxide adsorbent, desorption of the carbon dioxide from the carbon dioxide adsorbent is carried out. The carbon dioxide separation apparatus of the present invention further includes a cooling tower 14 for cooling the carbon dioxide adsorbent discharged from the drying tower 13, and a conveyor 15 for returning the carbon dioxide adsorbent discharged from the cooling tower 14 to the adsorbent hopper 10. The carbon dioxide separation apparatus further includes a recovery pump 16 for recovering the carbon dioxide desorbed in the regeneration tower 12, and a carbon dioxide holder 17 for storing the carbon dioxide. Thus, in the present embodiment, the carbon dioxide adsorbent of a moving bed circulates in the carbon dioxide separation apparatus 1, whereby separation of carbon dioxide is successively carried out.

The carbon dioxide separation apparatus according to the present embodiment functions as follows. Firstly, the treatment-target gas containing carbon dioxide is introduced to the lower part of the adsorption tower 11, and adsorbent of a moving bed is supplied from the adsorbent hopper 10 to the upper part of the adsorption tower 11. In the adsorption tower 11, the adsorbent and the treatment-target gas are brought into contact with each other, whereby the carbon dioxide is adsorbed by the adsorbent. The temperature of the carbon dioxide adsorbent at this time is about 40° C. in the present embodiment. The adsorbent of a moving bed shifts at a prescribed speed from the upper part of the adsorption tower 11 to the lower part thereof. Eventually, the carbon dioxide adsorbent is discharged from the lower part of the adsorption tower 11. The supply speed of the treatment-target gas and the shifting speed of the adsorbent are determined such that adsorption of the carbon dioxide is completed during the residence time of the adsorbent in the adsorption tower 11, and such that regeneration of the carbon dioxide adsorbent in the regeneration tower 12, which will be described later, is completed. When adsorption of the carbon dioxide is completed, the treatment-target gas is discharged from the upper part of the adsorption tower 11, and the carbon dioxide adsorbent is discharged from the lower part of the adsorption tower 11.

The adsorbent having adsorbed the carbon dioxide discharged from the adsorption tower 11 is subsequently transferred to the regeneration tower 12. In the regeneration tower 12, the carbon dioxide adsorbent transferred from above and desorption-purpose steam are brought into contact with each other. As will be described later, the desorption-purpose steam is generated in the drying tower 13, and introduced from the lower part of the regeneration tower 12. When the carbon dioxide adsorbent and the desorption-purpose steam are brought into contact with each other, the desorption-purpose steam condenses on the surface of the carbon dioxide adsorbent, and releases condensation heat at this time. In the present embodiment, this condensation heat of the desorption-purpose steam is used as the energy for desorbing the carbon dioxide.

The desorption of carbon dioxide by means of condensation of the desorption-purpose steam in this manner is completed in short time once the carbon dioxide adsorbent and the desorption-purpose steam are brought into contact with each other. In the steady state, the regeneration tower 12 is filled with substantially 100% carbon dioxide. Further, since desorption of carbon dioxide is completed in short time, it is known that the part where desorption of carbon dioxide takes place in the regeneration tower 12 is limited to a relatively narrow portion. Accordingly, in the case where the shape of the regeneration tower 12 (the carbon dioxide adsorbent) is cylindrical, desorption of carbon dioxide takes place in a thin plate-like zone (regeneration zone) being perpendicular to the center axis of this cylinder. Accordingly, the shifting speed of the carbon dioxide adsorbent in the regeneration tower 12 and the supply amount of the desorption-purpose steam are preferably adjusted such that the regeneration zone is located substantially at the center of the regeneration tower 12. As described above, the shifting speed of the moving bed also relates to the speed of adsorption of carbon dioxide in the adsorption tower 11. Accordingly, the shifting speed of the carbon dioxide adsorbent in the entire carbon dioxide separation apparatus 1 according to the present embodiment is determined taking into consideration of both the speed of adsorption of carbon dioxide and the speed of regeneration of carbon dioxide adsorbent.

In the regeneration tower 12, the carbon dioxide desorbed from the carbon dioxide adsorbent is compressed by the recovery pump 16 in the present embodiment, and stored in the carbon dioxide holder 17. On the other hand, the carbon dioxide adsorbent containing the condensed water after desorption of the carbon dioxide is discharged from the lower part of the regeneration tower 12.

The carbon dioxide adsorbent from which the carbon dioxide has been desorbed is subsequently transferred to the drying tower 13. In the drying tower 13, the carbon dioxide adsorbent containing the condensed water is dried. In the present embodiment, the carbon dioxide adsorbent is dried by being indirectly heated by means of a heat medium such as steam or hot water. By the carbon dioxide adsorbent being indirectly heated, the condensed water contained in the carbon dioxide adsorbent again becomes steam. Then, the steam is returned to the regeneration tower 12 and reused as desorption-purpose steam. In the present embodiment, since the desorption-purpose steam is reused while circulating through the regeneration tower 12 and the drying tower 13, adsorption and desorption of carbon dioxide by means of the carbon dioxide adsorbent can be successively carried out just with replenishing with pure water by a small amount corresponding to the loss amount. The carbon dioxide adsorbent being dried is discharged from the lower part of the drying tower 13.

Next, the carbon dioxide adsorbent discharged from the drying tower 13 is transferred to the cooling tower 14, and cooled to about 40° C., at which the carbon dioxide is adsorbed in the adsorption tower 11. Note that, this cooling tower 14 can be dispensed with in the case where the temperature of the carbon dioxide adsorbent is reduced by dissipation of heat while the carbon dioxide adsorbent is conveyed by the conveyor 15, which will be described later, to reach the temperature at which the carbon dioxide is adsorbed in the adsorption tower 11. The carbon dioxide adsorbent having been cooled is discharged from the lower part of the cooling tower 14.

Next, the cooled carbon dioxide adsorbent is conveyed to the adsorbent hopper 10 by the conveyor 15, and is again supplied to the adsorption tower 11 as a moving bed.

With the carbon dioxide separation apparatus 1 according to the present embodiment, since the carbon dioxide adsorbent of a moving bed is employed, adsorption of carbon dioxide can be successively carried out in the adsorption tower 11, and desorption of the carbon dioxide can be successively carried out in the regeneration tower 12. Therefore, steady successive recovery of carbon dioxide is achieved. Further, it is not necessary to switch the flow channel of the treatment-target gas. Thus, automation can be easily achieved. Further, since desorption-purpose steam can be obtained from the condensed water contained in the carbon dioxide adsorbent in the drying tower 13, the energy used for drying the adsorbent can be used as the energy for generating the desorption-purpose steam as it is. Thus, an energy-efficient carbon dioxide separation apparatus can be obtained. Furthermore, the amount of pure water used for desorption can be largely reduced since desorption-purpose steam is used in a circulating manner. Thus, the pure water just by a replenishing amount corresponding to the loss amount will suffice.

Note that, in the embodiment, in the case where the pressure inside the regeneration tower 12 is lower than the outside pressure, the outside air may flow into the regeneration tower 12. This may invite a reduction in the concentration of the recovered carbon dioxide. In such a case, it is preferable to provide a gas stream leakage preventing mechanism, specifically a lock hopper for example, between the adsorption tower 11 and the regeneration tower 12.

Similarly, in the case where the pressure inside the drying tower 13 is lower than the outside pressure, the outside air may flow into the drying tower 13. This may eventually invite a reduction in the concentration of the carbon dioxide recovered at the regeneration tower 12. In such a case, it is preferable to provide a gas stream leakage preventing mechanism such as a lock hopper also between the drying tower 13 and the cooling tower 14.

Figure 2:
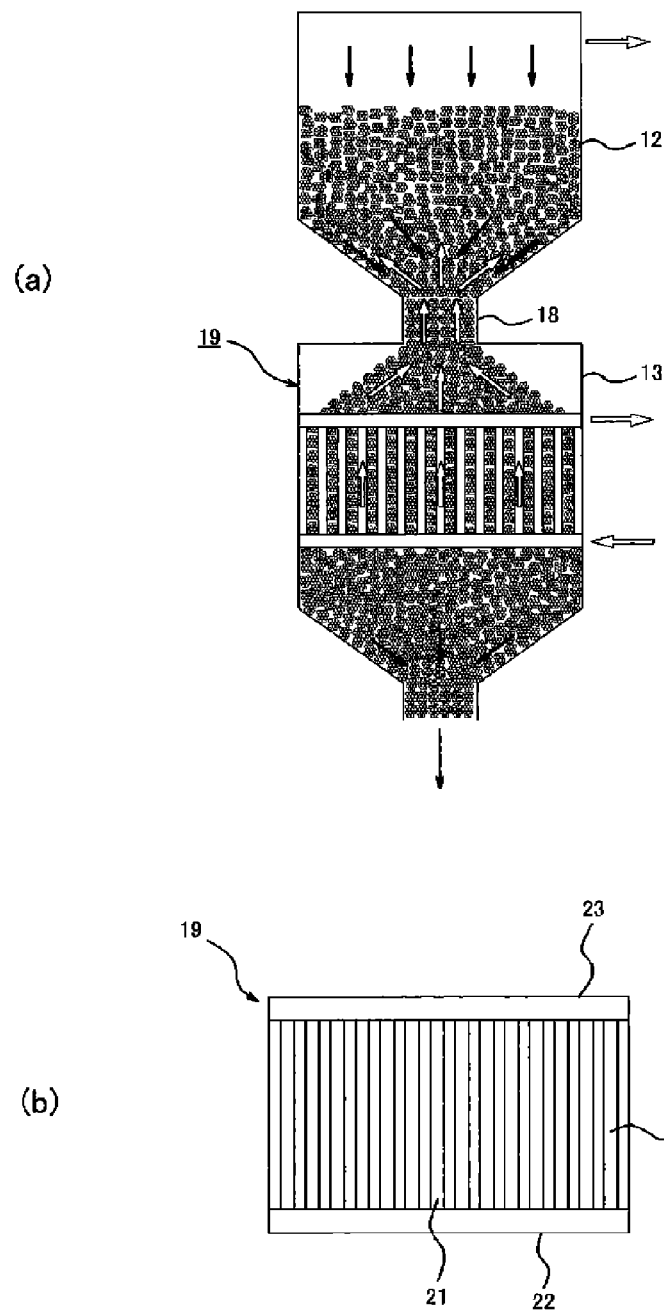
FIG. 2(a) is a detailed view showing the integrated structure of a regeneration tower and a drying tower in the carbon dioxide separation apparatus in FIG. 1.
FIG. 2(b) is a plan view of an adsorbent heating unit in FIG. 2(a).

FIG. 2(a) shows a more specific mode of the regeneration tower 12 and the drying tower 13 in the present invention. In the present embodiment, the regeneration tower 12 and the drying tower 13 are integrally structured via a connection portion 18. The carbon dioxide adsorbent is directly transferred from the regeneration tower 12 to the drying tower 13 through the connection portion 18. Further, desorption-purpose steam is directly returned from the drying tower 13 to the regeneration tower 12 through the connection portion 18. In the present embodiment also, the adsorbent having adsorbed carbon dioxide and discharged from the adsorption tower 11 shown in FIG. 1 is transferred to the regeneration tower 12. Note that, in the regeneration tower 12, it is preferable that the adsorbent having adsorbed carbon dioxide is evenly supplied over the entire regeneration tower 12 such that the regeneration zone where desorption of carbon dioxide takes place is located at the same level at any portion in the regeneration tower 12.

In the embodiment shown in FIG. 2(a) also, desorption-purpose steam used for desorption of carbon dioxide in the regeneration tower 12 is generated by indirect heating of the carbon dioxide adsorbent from which carbon dioxide has been desorbed and which contains condensed water. This indirect heating is specifically carried out by an adsorbent heating unit 19 provided in the drying tower 13. FIG. 2(b) shows only part of the adsorbent heating unit 19. As shown in FIG. 2(b), the adsorbent heating unit 19 has a structure in which a multitude of heat medium flow channels 20 and a multitude of adsorbent flow channels 21 are alternately formed. The heat medium flow channels 20 and the adsorbent flow channels 21 are formed by partition plates being disposed at regular intervals. To each of the heat medium flow channels 20, a shared introduction pipe 22 that supplies a heat medium such as steam or hot water used for heating the carbon dioxide adsorbent and a shared discharge pipe 23 for collecting the heat medium having heated the carbon dioxide adsorbent and discharged from the heat medium flow channels 20 are connected. In the present embodiment, as the heat medium, for example saturated steam of 60° C. (about 20 kPa) can be used. Accordingly, the pressure in the regeneration tower 12 is adjusted to 20 kPa by the recovery pump 16. Note that the heat medium used for indirectly heating the drying tower 13 is only required to satisfy the condition under which drying heat can flow in (60° C. or more). By such a heat medium, the carbon dioxide adsorbent that descends the adsorbent flow channels 21 is indirectly heated, and the condensed water contained in the carbon dioxide adsorbent turns into steam. This steam reaches the regeneration tower 12 passing through the descending carbon dioxide adsorbent, and is used as the desorption-purpose steam at the regeneration tower 12.

In the case where the carbon dioxide separation apparatus shown in FIG. 2(a) is prepared and actually driven, for example, the shifting speed of the carbon dioxide adsorbent becomes 0.05 to 0.5 m/min, whereas the residence time of the carbon dioxide adsorbent in the regeneration tower 12 becomes about 5 minutes and the residence time of the carbon dioxide adsorbent in the drying tower 13 becomes about 15 minutes. Provision of such an adsorbent heating unit 19 allows drying of the carbon dioxide adsorbent and generation of desorption-purpose steam to be efficiently carried out. In this embodiment also, condensation heat of the desorption-purpose steam is used as the energy for desorbing the carbon dioxide.

Further, in the embodiment shown in FIG. 2(a) also, the shifting speed of the carbon dioxide adsorbent and the supply amount of the desorption-purpose steam in the regeneration tower 12 are preferably adjusted such that the aforementioned regeneration zone is located substantially at the center of the regeneration tower 12. Accordingly, as described above, the shifting speed of the carbon dioxide adsorbent in the entire carbon dioxide separation apparatus 1 according to the present embodiment is determined taking into consideration of the speed of regeneration of the carbon dioxide adsorbent, in addition to the speed of adsorption of carbon dioxide.

Figure 3:
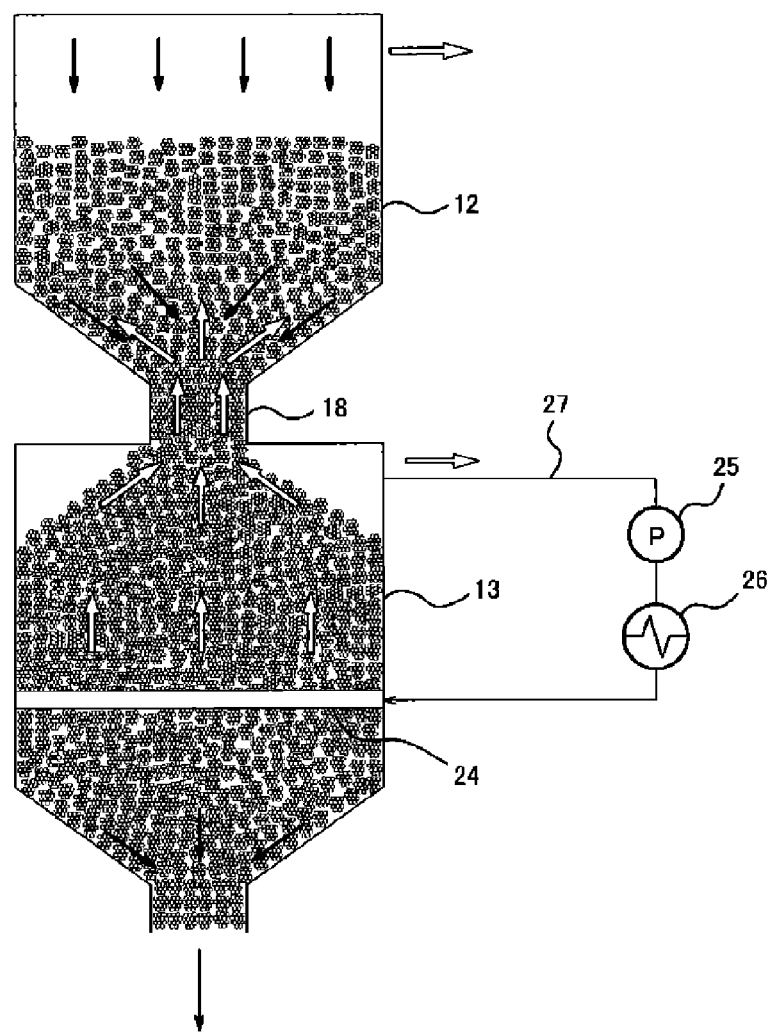
FIG. 3 is a view showing other structure of the regeneration tower and the drying tower of the carbon dioxide separation apparatus shown in FIG. 1.

FIG. 3 shows other specific mode of the regeneration tower 12 and the drying tower 13 of the present invention. In the present embodiment also, the regeneration tower 12 and the drying tower 13 are integrally structured via the connection portion 18. Accordingly, the carbon dioxide adsorbent is directly transferred from the regeneration tower 12 to the drying tower 13 through the connection portion 18, and the desorption-purpose steam is directly returned from the drying tower 13 to the regeneration tower 12 through the connection portion 18. In the present embodiment also, the adsorbent having adsorbed carbon dioxide is evenly supplied over the entire regeneration tower 12 such that the regeneration zone where desorption of carbon dioxide takes place is located at the same level at any portion in the regeneration tower 12.

The embodiment shown in FIG. 3 is different from the embodiment shown in FIG. 2(a) in that no adsorbent heating unit 19 is provided. In the present embodiment, regeneration of the carbon dioxide adsorbent is carried out by allowing superheated steam to be brought into contact with the carbon dioxide adsorbent. That is, in the present embodiment, superheated steam is evenly supplied to the regeneration tower 12 via an introduction pipe 24 shown in FIG. 3. That is, in the present embodiment, by the superheated steam being evenly supplied to the regeneration tower 12 via the introduction pipe 24 shown in FIG. 3, regeneration of the carbon dioxide adsorbent is carried out. The superheated steam used herein is, for example, about 20 kpa and 120° C. In the present embodiment, the superheated steam is directly brought into contact with the carbon dioxide adsorbent. Accordingly, in the upper part of the drying tower 13, mixed steam made up of steam generated from the condensed water contained in the carbon dioxide adsorbent and steam derived from the superheated steam used in heating exists. This mixed steam is saturated steam of 60° C., for example. As described above, since this mixed steam also contains steam used to vaporize the condensed water during the drying, steam exists at the upper part of the drying tower 13 more than the required desorption-purpose steam. Accordingly, only part of the mixed steam is sent to the regeneration tower 12 and used as the desorption-purpose steam.

In the present embodiment, the mixed steam not used as the desorption-purpose steam is sent to a circulating pump 25 via a line 27 as shown in FIG. 3, and heated by an indirect heating device 26 to become superheated steam. The superheated steam is again sent to the introduction pipe 24. In the example described above, the mixed steam is used as the desorption-purpose steam by about 5%. The residual 95% is heated by the indirect heating device 26 and again used as superheated steam. Here, in the case where the superheated steam of higher temperatures is used, the amount of heat required for drying can be obtained by the superheated steam of a small amount. Therefore, in such a case, the amount of steam circulating through the drying tower 13 and the indirect heating device 26 can be smaller than 95%.

In the case where the carbon dioxide separation apparatus shown in FIG. 3 is prepared and actually driven, for example, the shifting speed of the carbon dioxide adsorbent is 0.05 to 0.5 m/min, whereas the residence time of the carbon dioxide adsorbent in the regeneration tower 12 is about 5 minutes and the residence time of the carbon dioxide adsorbent in the drying tower 13 is about 5 minutes. Accordingly, with the carbon dioxide separation apparatus shown in FIG. 3, it can be seen that the residence time of the carbon dioxide adsorbent in the drying tower 13 is shorter than that of the apparatus shown in FIG. 2, whereby a reduction in size of the entire apparatus can be achieved.

INDUSTRIAL APPLICABILITY

With the carbon dioxide separation apparatus of the present invention, carbon dioxide can be recovered from a treatment-target gas at high concentration. Accordingly, it can be used in the field of exhaust gas treatment.

DESCRIPTION OF REFERENCE SIGNS

1: Carbon dioxide separation apparatus
11: Adsorption tower
10: Adsorbent hopper
12: Regeneration tower
13: Drying tower
14: Cooling tower
15: Conveyor
16: Recovery pump
17: Carbon dioxide holder
18: Connection portion
19: Adsorbent heating unit
20: Heat medium flow channel
21: Adsorbent flow channel
22: Introduction pipe
23: Discharge pipe
24: Introduction pipe
25: Circulating pump
26: Indirect heating device
27: Line

The invention claimed is:

1. A carbon dioxide separation apparatus that separates carbon dioxide from a treatment-target gas containing carbon dioxide using a carbon dioxide adsorbent and that regenerates the carbon dioxide adsorbent having adsorbed the carbon dioxide, the carbon dioxide separation apparatus comprising:
a moving bed-type adsorption tower in which carbon dioxide is adsorbed from the treatment-target gas by the carbon dioxide adsorbent, the adsorption tower discharging the treatment-target gas having undergone adsorption, the adsorption tower discharging the carbon dioxide adsorbent having adsorbed the carbon dioxide;
a moving bed-type regeneration tower that receives the carbon dioxide adsorbent having adsorbed the carbon dioxide and discharged from the adsorption tower, the regeneration tower allowing desorption-purpose steam to be condensed on the carbon dioxide adsorbent such that the carbon dioxide is desorbed from the carbon dioxide adsorbent, the regeneration tower thereafter discharging the carbon dioxide adsorbent;
a moving bed-type drying tower that receives the carbon dioxide adsorbent discharged from the regeneration tower, the drying tower heating the carbon dioxide adsorbent such that condensed water contained in the carbon dioxide adsorbent is vaporized as steam and such that the carbon dioxide adsorbent is dried, the drying tower thereafter discharging the dried carbon dioxide adsorbent; and
a conveying mechanism that conveys the dried carbon dioxide adsorbent discharged from the drying tower to the adsorption tower, wherein
the steam generated by the heating in the drying tower from the condensed water contained in the carbon dioxide adsorbent is used as the desorption-purpose steam in the regeneration tower such that water is used in a circulating manner through the regeneration tower and the drying tower.

2. The carbon dioxide separation apparatus according to claim 1, wherein
the drying of the condensed water contained in the carbon dioxide adsorbent in the drying tower is carried out by indirect heating, and
the steam generated from the condensed water is entirely used as the desorption-purpose steam.

3. The carbon dioxide separation apparatus according to claim 1, wherein
the drying of the condensed water contained in the carbon dioxide adsorbent in the drying tower is carried out using superheated steam, and
mixed steam made up of the steam generated from the condensed water and steam derived from the superheated steam is partially used as the desorption-purpose steam.

4. The carbon dioxide separation apparatus according to claim 3, further comprising:
an indirect heating device that again supplies superheated steam obtained by heating the mixed steam as the superheated steam in the drying tower; and
a circulating pump that allows the mixed steam and the superheated steam to circulate.

5. The carbon dioxide separation apparatus according to claim 1, further comprising a recovery mechanism that recovers the carbon dioxide having been desorbed and discharged from the regeneration tower.

6. The carbon dioxide separation apparatus according to claim 1, wherein the regeneration tower and the drying tower are integrally structured.

7. The carbon dioxide separation apparatus according to claim 1, further comprising a gas stream leakage preventing mechanism that is provided immediately upstream from the regeneration tower and/or immediately downstream from the drying tower.

8. The carbon dioxide separation apparatus according to claim 1, further comprising a cooling tower for cooling the carbon dioxide adsorbent discharged from the drying tower.

* * * * *